United States Patent [19]

Frick

[11] 4,325,399
[45] Apr. 20, 1982

[54] CURRENT TO PRESSURE CONVERTER APPARATUS

[75] Inventor: Roger L. Frick, Eden Prairie, Minn.

[73] Assignee: Rosemount Inc., Eden Prairie, Minn.

[21] Appl. No.: 94,443

[22] Filed: Nov. 15, 1979

[51] Int. Cl.³ .................................................. G05D 16/00
[52] U.S. Cl. ..................................... 137/85; 137/487.5
[58] Field of Search ............... 137/625.64, 487.5, 486, 137/84, 85, 625.66, 625.63; 251/129, 131

[56] References Cited

U.S. PATENT DOCUMENTS

| | | | |
|---|---|---|---|
| 2,456,669 | 7/1969 | Lloyd | 137/84 |
| 2,505,981 | 5/1950 | McLeod | 137/85 UX |
| 2,842,147 | 7/1958 | Markson | 137/85 |
| 2,917,064 | 12/1959 | Hunter | 137/85 |
| 2,993,497 | 7/1961 | Coles | 137/85 |
| 3,113,582 | 12/1963 | Hudson | 137/85 X |
| 3,625,246 | 12/1971 | Reaves | 137/625.66 X |

*Primary Examiner*—Alan Cohan
*Attorney, Agent, or Firm*—Kinney, Lange, Braddock, Westman and Fairbairn

[57] ABSTRACT

The present invention relates to a current controlled pressure regulating apparatus for operating pneumatically operated elements such as valves in process control systems and the like. The apparatus is designed to provide for direct mechanical control of the pressure regulating apparatus in response to changes in current flow in a two wire current controller.

6 Claims, 7 Drawing Figures

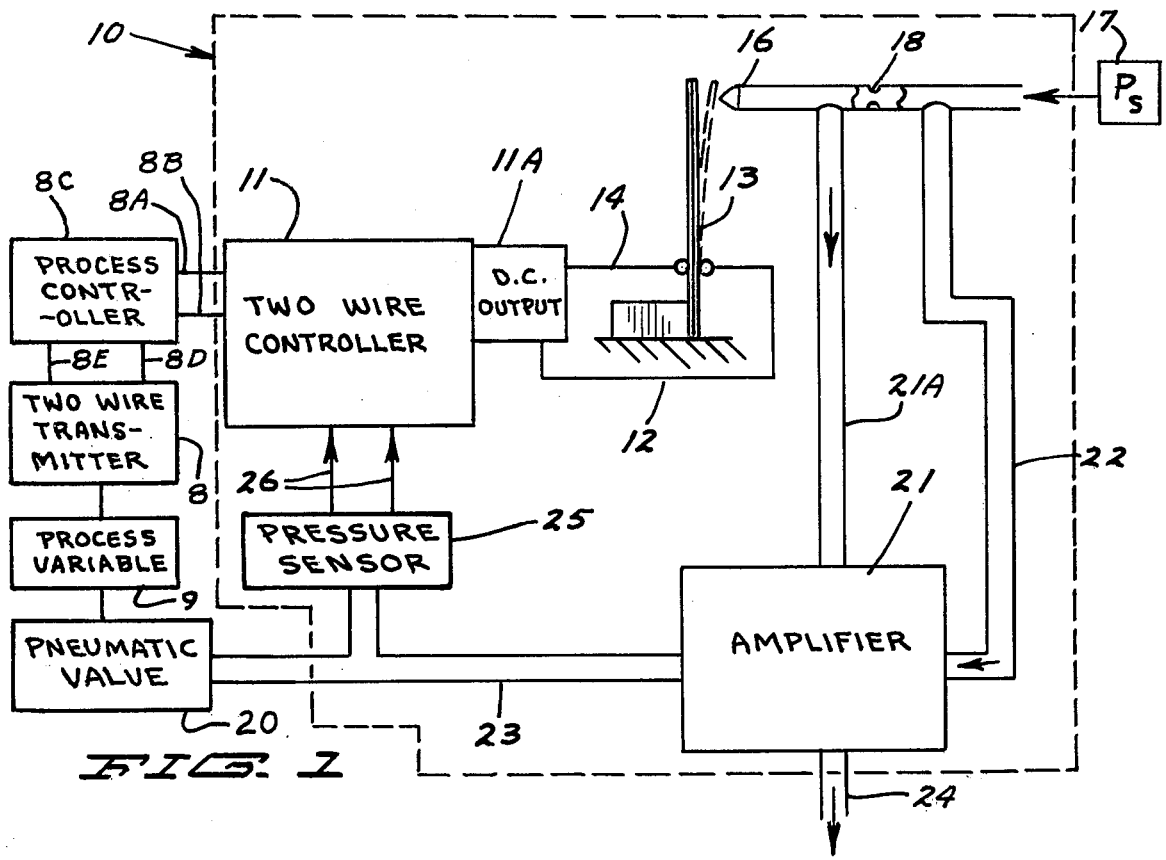
FIG. 1
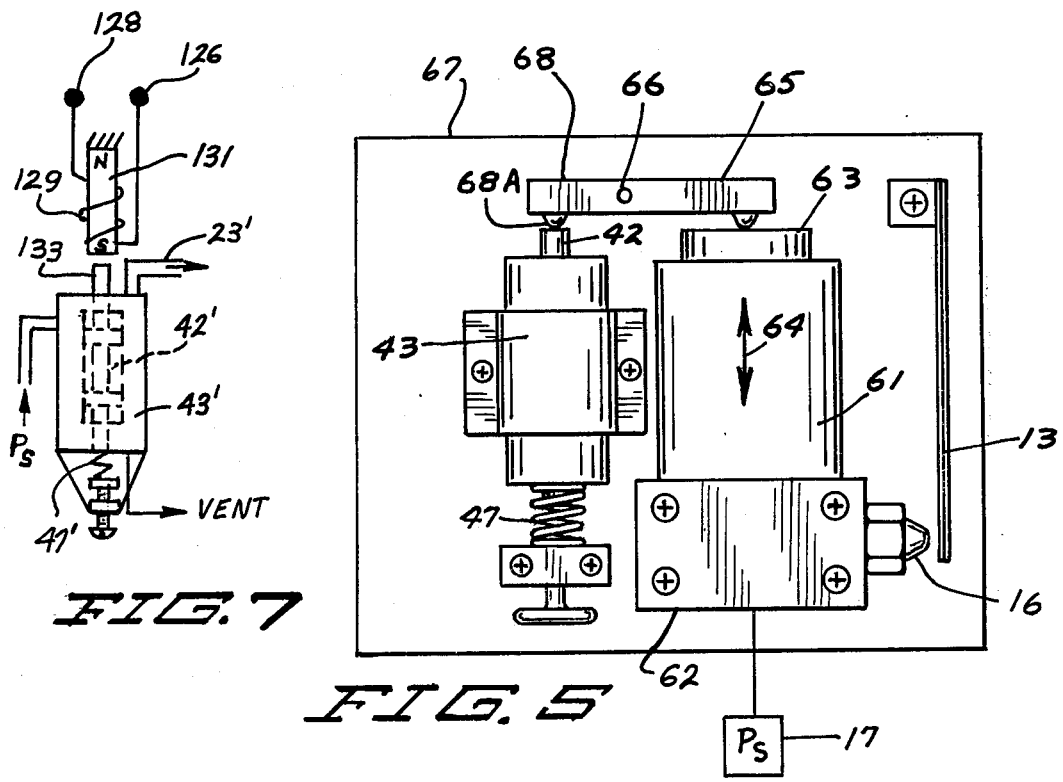
FIG. 7
FIG. 5

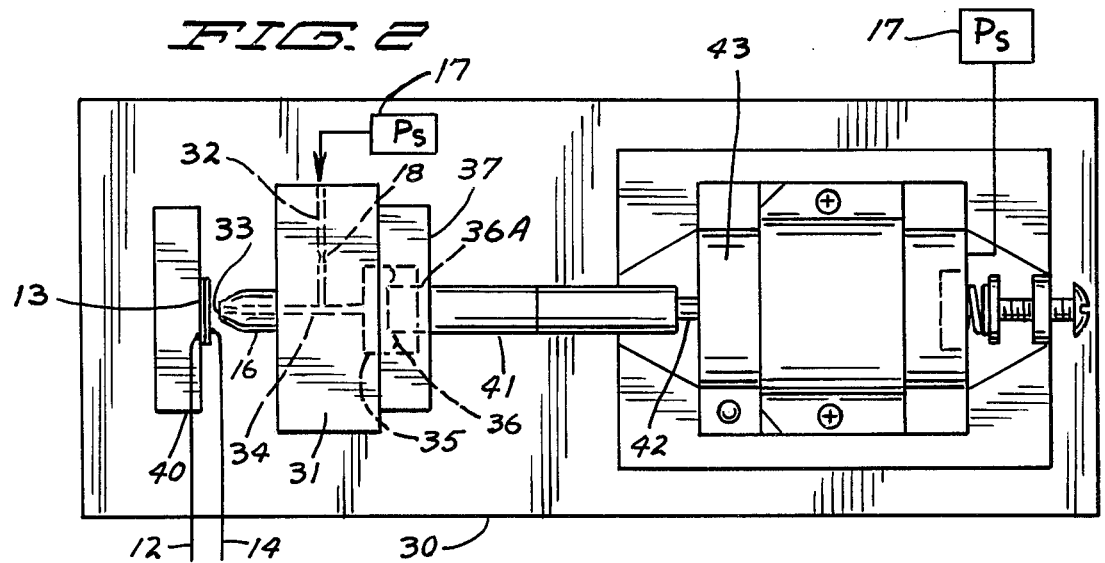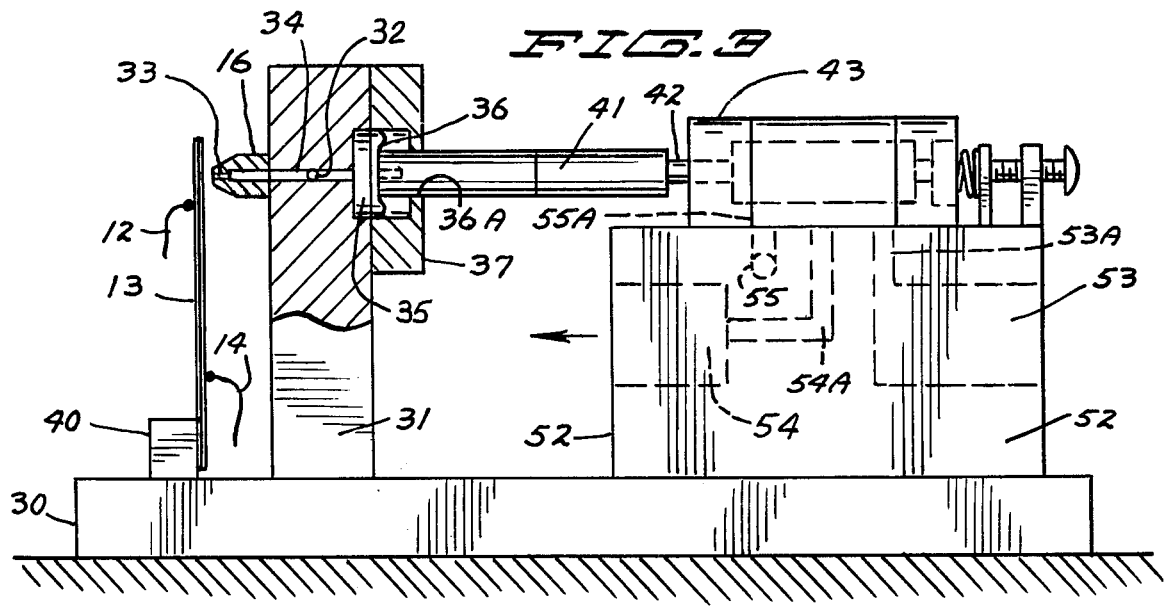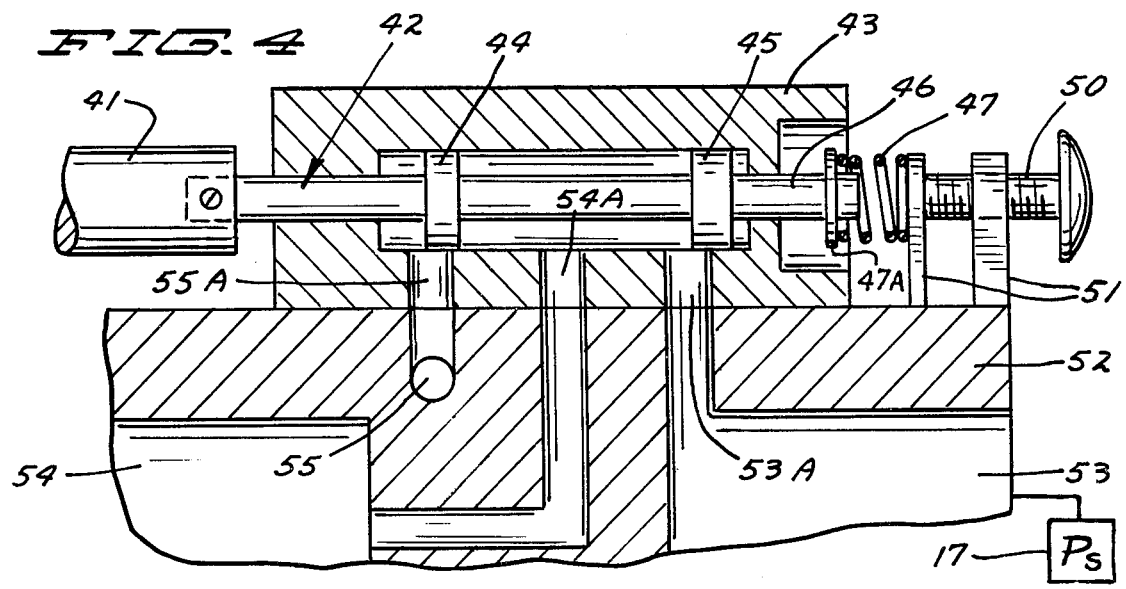

CURRENT TO PRESSURE CONVERTER APPARATUS

BACKGROUND OF THE INVENTION

1. Field of the Invention

The present invention relates to current to pressure transmitter apparatus.

2. Prior Art

Various electro pneumatic transducers which convert a current signal into a pressure signal for controlling valves and the like have been advanced. For example, Fischer Controls of Marshalltown, Iowa makes several models, typical of which is the Type 456 Electro Pneumatic Transducer. However, these devices provide for a control pressure which utilizes an armature for controlling a gas flow, and which gas flow in turn operates a feedback diaphragm controlling the bleed of a supply of gas under pressure to atmosphere.

An additional type of device which operates on a similar principle, but which uses mechanical feedback is called the E69 Series Current Pneumatic Converter Positioner made by the Foxboro Company of Foxboro, Mass.

Certain prior art current to pressure converters use a type of a flapper valve controlling a flow from a nozzle, and the use of a piezoelectric crystal as a flapper has also been known in the prior art. U.S. Pat. No. 3,456,669 illustrates a piezoelectric flapper valve, operating in a transducer for providing current to pressure conversion. However, in this situation, the flapper valve controls the exhaust of fluid from a chamber. An additional piezoelectric bender element used for controlling pressure outflow from nozzles is shown in U.S. Pat. No. 3,063,422.

A control element using a flapper controlling nozzle pressure output is shown in U.S. Pat. No. 2,914,076, and a bellows in this device operates a rheostat for providing a signal indicating the pressure of the fluid being controlled.

An additional control apparatus using fluid pressure signals is shown in U.S. Pat. No. 2,928,409. Typical other examples of this type of device include U.S. Pat. Nos. 2,939,430 and 3,134,425.

SUMMARY OF THE INVENTION

The present invention relates to a current to pressure transmitter operated in connection with a two wire controller providing a DC signal which controls the output of a pneumatic amplifier. The pneumatic amplifier includes a force balanced valve spool which may be directly actuated by a magnetic flux responsive movable element or by a pressure responsive movable wall or element.

As shown herein the opening of a pressure bleed nozzle or valve may be controlled by the DC signal. The pressure in the bleed nozzle or valve chamber determines the position of a diaphragm or similar mechanical element which is directly coupled to a spool of a gaseous fluid amplifier that provides the final control pressure.

The output control pressure of the gas amplifier is sensed and an electrical feedback signal representative of the output control pressure is provided and compared to the DC signal for controlling the DC signal and thus the output control pressure.

BRIEF DESCRIPTION OF THE DRAWINGS

FIG. 1 is a block diagram representation of a current to pressure converter made according to the present invention;

FIG. 2 is a top plan view of a pressure sensing and gas amplifying apparatus for a current to pressure transmitter made according to the present invention;

FIG. 3 is a side view of the device of FIG. 2 with parts in section and parts broken away;

FIG. 4 is an enlarged sectional view of a spool valve gas type amplifier utilized with the device of FIG. 2;

FIG. 5 is a top plan view of a modified form of the device of FIG. 2;

FIG. 7 is a schematic showing of the fluid amplifier valve directly coupled to a magnetic coil actuator which is powered as shown in FIG. 6.

DESCRIPTION OF THE PREFERRED EMBODIMENTS

Figure 6:
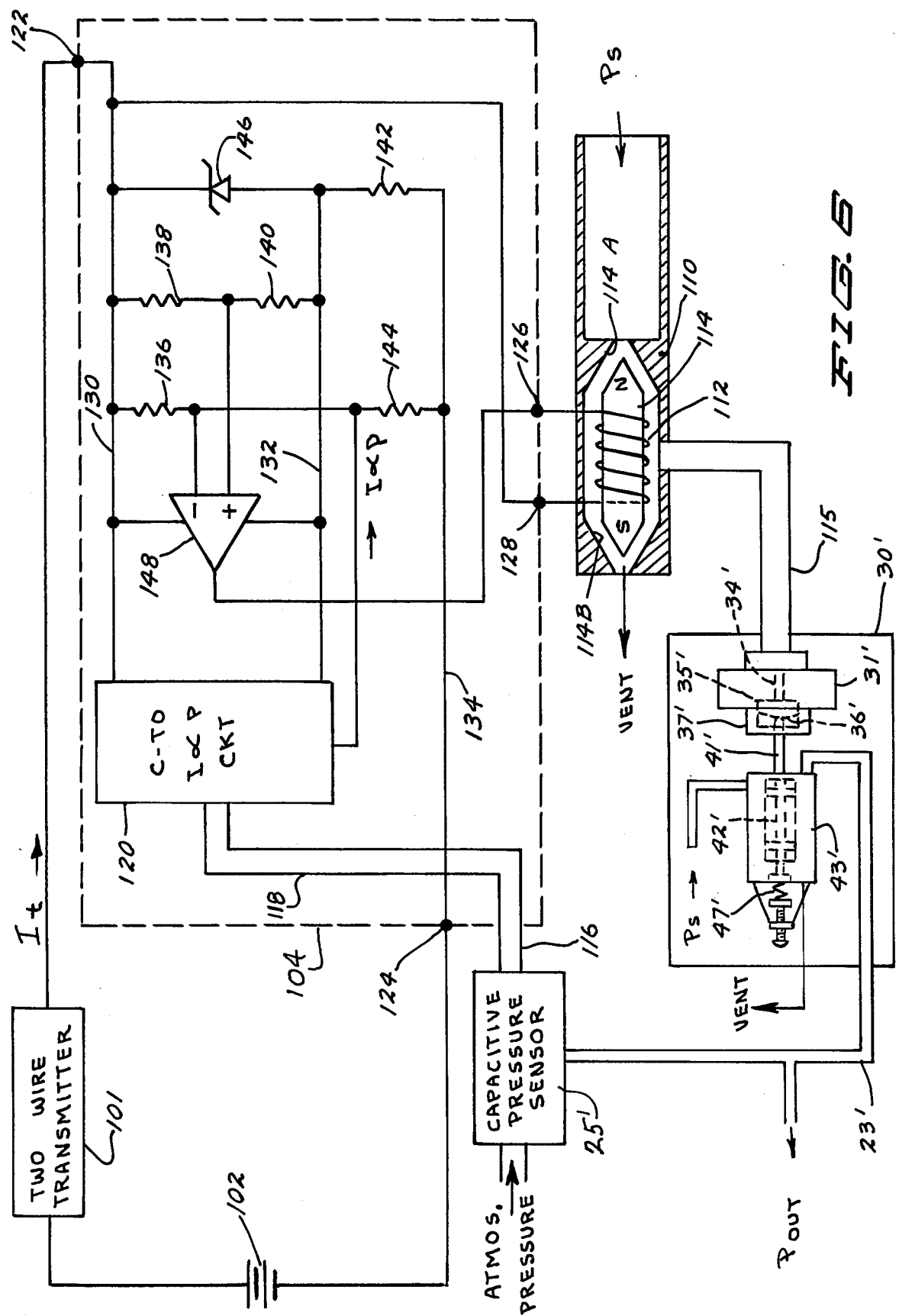
FIG. 6 is a schematic representation of a modified form of the invention showing a magnetically controlled valve element.

Referring first to FIG. 1 for a schematic representation of the operation of this device, the current to pressure converter shown generally at 10 is an electric signal controlled apparatus using a directly controlled mechanically operated fluid amplifier. Converter 10 is used in connection with a process controller 8C which outputs a current along a pair of wires 8A and 8B to a two wire controller 11. A two wire current transmitter 8 provides a current which preferably is DC along a pair of wires 8D and 8E to the process controller 8C. The current provided along wires 8D and 8E is a function of a sensed parameter of a process variable 9 such as pressure, flow, temperature or the like. Typically process controller 8C will provide current from 4 to 20 or from 10 to 50 milliamps across its range of operation.

The DC current provided by process controller 8C is used as a command signal to a two wire controller illustrated generally at 11. The output of controller 11 is a function of the current from the two wire transmitter and as shown provides a DC output from DC output means 11A. The circuit of the two wire controller is more fully explained in U.S. patent application Ser. No. 94,444, filed Nov. 15, 1979 entitled control circuit for current to Pressive Converter. A typical two wire transmitter used in processes is shown in U.S. Pat. No. 3,646,538. An output voltage from DC output means 11A is passed through lines 12 and 14 to the opposite sides of a "bimorph" blade or flapper type valve 13. A bimorph is formed of two piezoelectric plates cemented together with an insulator between the plates and oriented such that an applied voltage across the two piezoelectric plates caused one plate to expand and the other to contract so that the bimorph bends proportionally to the applied voltage. The bimorph flapper 13 bends an amount dependent upon the DC output voltage of DC output means 11A. The flapper 13 generally moves between its dotted and solid line positions shown in FIG. 1. The amount of deflection of this bimorph flapper valve (other types of flapper valves may be utilized) controls the flow of gas from a nozzle assembly 16 and hence the pressure on the interior of the nozzle.

Schematically a source of gas under pressure 17, such as a pneumatic compressor provides gas under pressure to nozzle assembly 16. A portion of the gas passes through an orifice 18, and out through a nozzle opening adjacent the flapper valve 13, which, because of its flexure controls the pressure to a gaseous fluid amplifier 21 through conduit 21A. The fluid amplifier 21, as will be more fully explained, responds mechanically directly through a suitable diaphragm or other mechanical pressure transmitting element to control a valve which in turn controls a second portion of the fluid under pressure from the supply 17 which is supplied through a conduit 22. The output of the fluid amplifier 21 is a control pressure in a control pressure conduit 23 that is coupled to a fluid pressure responsive element in the process being controlled such as a pneumatic valve 20. The pneumatic valve controls a function in the process being monitored, which affects the process variable being sensed by transmitter 8. The adjustment of pneumatic valve 20 is made to bring the process variable back to a desired state. An exhaust pressure conduit 24 is provided as a bleed through the amplifier 21.

The control pressure conduit 23 not only carries the control pressure signal for operation of the controlled pneumatic valve 20, but also provides the control pressure signal to a pressure sensor 25, which in turn provides an electrical output signal along lines 26 to the two wire current controller 11 for feedback.

The feedback signal is compared with the input current signal from the process controller 8C and the control signal to DC output means 11A is stabilized at a level dependent upon the input signal and the feedback signal. Thus the bending of bimorph valve 13, and the resultant control pressure signal is responsive to the input signal from the two wire transmitter and process controller and the feedback signal provides indication of when the control pressure is at the proper level.

FIGS. 2-4 show details of the present device including a mounting block 30 utilized for supporting an upright column 31 which has a longitudinal passageway 32 therein and which includes an orifice 18. Pressure from source 17 is coupled to passageway 32 and through the passageway to a nozzle pressure passageway 34 in block 31. The passageway 34 opens through nozzle 16 which is attached to block 31. The nozzle 16 has an outlet port or opening 33 through which gas (air) from source 17 is discharged.

The passageway 34 is also open to a chamber 35 defined in block 31 and which is closed by a flexible diaphragm or movable wall element 36, which is held in place on the block 31 with a housing 37.

The flapper valve 13, as shown, is positioned adjacent the outlet port 33 of the nozzle 16, and pressure from supply 17 thus bleeds through the orifice passageway 32 and out through the port 33 and strikes the flapper valve 13, which is mounted for bending movement with respect to a base 40 mounted on block 30. The upper end of flapper 13 is spaced from port 33 and will bend toward the port 33 to restrict flow out from the nozzle as voltage carried by lead wires 12 and 14 from the DC outut means 11A of two wire controller 11 and applied to flapper 13 is increased.

In this embodiment a piezoelectric bimorph flapper 13 is utilized. However, other types of valves and flappers may be utilized such as magnetically actuated pivoting levers or other proportional flow valve devices. In any event the spacing between the surface of the flapper from the port 33 and the cross sectional area of port 33 determine the volume of gas (air) that bleeds through the port 33. The flexure of flapper 13 controls the pressure in passageway 34 and thus the pressure in chamber 35. The position of the diaphragm 36 is a function of the pressure in chamber 35. A mechanical link 41, such as a dowel, is slidably mounted through an aperture 36A in block 37 and is attached in a suitable manner to diaphragm or movable wall 36. The link 41, at its opposite end from the diaphragm 36, in turn is attached to the shaft portion of a valve element, as shown, a valve spool 42. Valve spool 42 is mounted in a valve spool housing 43. The valve spool 42 includes a first land 44, and a second land 45. The opposite end of the valve spool 42 from the link 41 is indicated at 46, and the opposite end 46 is spring loaded with a compression spring 47. The compression of compression spring 47 is adjustable with an adjusting screw 50 that is threadably mounted with respect to upright supports 51 mounted onto a main support block 52, which is mounted on block 30. Spring 47 acts against a washer 47A which is directly coupled to end 46 of valve spool 42 and provides a force urging spool 42 and diaphragm 36 in direction opposing the force of the gas under pressure acting on diaphragm 36. The support block 52 includes a pressure supply chamber 53 which is connected to the pressure source 17, an output or control pressure chamber 54, and an exhaust passageway 55 or vent which leads to atmospheric pressure or other lower pressure area.

The valve spool housing 43 has an inlet or supply passageway 53A forming a port to valve spool 42 coupled to pressure supply chamber 53, an output passageway 54A forming a control pressure port to the valve spool which connects with the chamber 54, and an exhaust passageway 55A forming an exhaust port to the valve spool, which connects to the exhaust passageway 55.

The movement of the valve spool 42, and, in particular, lands 44 and 45, controls the amount of gas under pressure from the pressure supply 17 through chamber 53 and passageway 53A, which is diverted either through exhaust passageway 55A or the control pressure passageway 54A and out through the chamber 54, which is coupled to control pressure line 23 (shown in FIG. 1). The valve spool is a fluid proportioning device which regulates the output pressure as a function of position of valve spool 42.

The position of valve spool 42 initially in relation to the diaphragm 36 can be adjusted by any desired means, and the compression of spring 47 can be adjusted so that the movement of the valve spool 42 can be related in a known manner to the pressure that is present in passageway 34. The system is an active system and when the flapper is in a reference position, there is pressure in chamber 35. The spring 47 is adjusted to position the valve spool properly. The flapper 13, which is preferably a bimorph member, bends in relation to the electrical signal applied to it by the two wire current controller 11. The valve spool 42 also moves back and forth as the diaphragm 36 moves when pressure in chamber 35 changes as determined by the position of flapper 13. The magnitude of movement of valve spool 42 is determined by the magnitude of the flapper movement, which is proportional to the voltage (electrical signal) along lines 12 and 14 and by the output pressure present. Dependent on the pressure integrity of the system, in equilibrium, spool 42 may be positioned such that lands 44 and 45 block both passageways 53A and 55A. That is, if the system were virtually pressure tight, the lands 44 and 45 could close both passageway 53A and 55A and the pressure in the output conduit 23 would be maintained at the set present level, as required by the input signal. If however, there is a small leak in the system the spool valve and lands 44 and 45 may be in position to allow only a small amount of flow to conduit 23.

Finally, if the leak is excessive, the lands 44 and 45 may be in position such that full flow is allowed, to sustain the pressure in conduit 23 at as close as possible to the desired pressure.

In the reference position of valve spool 42 the forces on the valve spool are balanced (at equilibrium). That is the spring force from spring 47 is balanced by the force from diaphragm 36. Thus there is zero net force on the spool and any changes in pressure in chamber 35 caused by movement of flapper 13 results in a fast response of the valve spool 42. The spring rate of spring 47 is selected so that the spool moves at a known relation to the amount of bending of the flapper valve 13. The control pressure preferably ranges from 3 to 15 psi, but other ranges may be used. Thus, at a 4 milliamp flow from the two wire transmitter 8 to the process controller 8C for example, the control pressure preferably is 3 psi. The range for a 4–20 milliamp two wire transmitter would then be about 15 psi control pressure at full scale current (20 milliamps) from the two wire transmitter to the process controller.

In the second form of the invention shown in FIG. 5, the flapper 13 has one end mounted on a support 67 and its opposite end is adjacent a nozzle 16 which corresponds to and is controlled in the same manner as nozzle 16 in the first form of the invention. The nozzle 16 exhausts fluid under pressure from pressure source 17 and the flapper 13 controls the pressure at the nozzle. However, in this instance, a bellows assembly indicated generally at 61 is provided on a mounting block 62, mounted on support 67, and the bellows has a movable actuating end wall or element 63. The bellows 61 is open to the interior of nozzle 16 and expands and contracts in direction as indicated by the double arrow 64 in relation to the amount of movement of the flapper 13, which controls the pressure within the bellows 61.

The actuator end wall 63 of the bellows bears against one end of a lever 65 which is pivotally mounted as at 66 on a pivot member mounted onto the support 67. The opposite end of the lever 65 as indicated at 68 has an actuator 68A bearing against one end of the valve spool 42 which is mounted in a valve housing 43, as shown in the previous form of the invention. The valve spool 42 is spring loaded or biased against the force generated by pressure in the bellows, also as explained in the previous embodiment. The spring load thus tends to resist expansion of the bellows 61 and the forces may be transferred to the lever and spool with only contact or bearing connections. If desired, the lever 65 can be pivotally connected to the actuator end wall 63 of the bellows and to valve spool 42.

The lever 65 affects the amount of valve spool movement for a given change of pressure caused by the change in the opening of flapper 13 relative to nozzle 16, and provides either a mechanical advantage for additional force for actuating the valve spool 42, or a motion advantage if desired.

The fluid amplifier assembly used with the device shown in FIG. 5 includes the same components as previously described, and operates in the same manner to control the output or control pressure.

The pressure sensor 25 shown in FIG. 1 could be replaced with a position sensor that would sense a position of an element in the process being controlled and provide a feedback signal that would be proportional to the movement or position of a control valve or similar device in the process. Devices that may be used as position sensors include LVDT'S, potentiometers, strain gages, synchros or other position encoding devices.

The diaphragm 36, mechanical link 41 and the valve spool and housing form parts of the fluid amplifier. The valve spool and valve housing are existing valve members commercially available.

FIG. 6 illustrates another preferred embodiment of the present invention which utilizes a magnetically controlled current to pressure transducer in place of the flapper valve arrangement previously disclosed and also specifically showing a capacitive type feedback pressure sensor which corresponds to sensor 25 of FIG. 1. As shown in FIG. 6, a two wire transmitter 101 is connected in a series circuit with a power supply 102 and electronic two wire controller 104. The output of controller 114 is supplied as a current to a servo valve 110. The magnitude of the current supplied by controller 104 determines the magnetic field produced by a coil 112 of a servo or magnetic flapper valve 110, and thereby determines the position of a magnetic field responsive plunger or element 114 is relation to valve seats 114A. When a magnetic flapper valve is used, a permanent magnet field biased by a magnetic fluid generated from a coil, such as coil 112, urges the ferro-magnetic flapper to a desired position. Such action is similar to the action of a permanent magnet DC motor. Input pressure $P_S$ is supplied to the housing of servo valve 110 across valve seat 114A and the opening at valve seat 114B determines the amount of fluid flow to vent or exhaust and thus the pressure in the housing of servo valve 114 and the pressure in a valve output conduit 115. The pressure in line 115, which corresponds to line 21A in FIG. 1, is thus determined by the position of plunger 114 within the housing of servo valve 110.

In the embodiment shown in FIG. 6, pressure sensor 25′ is a capacitive pressure sensor which is preferably of the type described in previously-mentioned Frick U.S. Pat. No. 3,646,538. Pressure sensor 25′ compares the output pressure $P_{OUT}$ with atmospheric pressure. Output lines 116 and 118 from capacitive pressure sensor 25′ are supplied to a capacitance to current as a function of pressure C-to-I $\propto$ P circuit 120 within two wire controller 104. In a preferred embodiment of the present invention, C-to-I $\propto$ P circuit 120 is of the type described in the previously mentioned Frick U.S. Pat. No. 3,646,538 which provides a DC current output which varies in proportion to pressure sensed with a capacitance type pressure sensor.

Controller 104 has terminals 122 and 124 connected in series with two wire transmitter 101 and DC power source 102. Output terminals 126 and 128 of controller 104 are connected to coil 112 of servo valve 110.

Current $I_t$ from two wire transmitter 101 is supplied to terminal 122, which is connected to first main conductor 130. A second main conductor 132 is also connected to circuit 120, and a third main conductor 134 is connected to terminal 124.

Controller 104 includes a bridge circuit formed by resistors 136, 138, 140, 142 and 144. Resistors 138 and 140 are connected in series between conductors 130 and 132. Resistor 142 is connected between conductors 132 and 134. Resistors 136 and 144 are connected between conductors 130 and 134.

Zener diode 146 establishes a reference voltage between conductors 130 and 132. The cathode of Zener diode 146 is connected to conductor 130, while its anode is connected to conductor 132.

Error amplifier 148 has its non-inverting input connected to the junction of resistors 138 and 140, and has its inverting input connected to the junction of resistors 136 and 144. The output of amplifier 148 is connected to output terminal 126. Conductors 130 and 132 are also connected to amplifier 148 to supply power.

Resistor 144 of the bridge circuit is a feedback resistor through which a feedback current $I \propto P$ flows. Current 120 is connected to the junction of resistors 136 and 124 to supply the feedback current $I \propto P$.

It can be seen, therefore, that the voltage supplied to the inverting input of amplifier 148 is a DC feedback signal which is a function of the output pressure $P_{OUT}$ sensed by capacitive pressure 25'. The voltage supplied to the non-inverting input of amplifier 148 is a DC command signal which is a function of current $I_t$ supplied by two wire transmitter 101.

When a change in current $I_t$ occurs, the DC command signal voltage supplied to the non-inverting input of amplifier 148 changes, thereby creating an unbalance between the DC command and the DC feedback signals. Amplifier 148 slews in a direction determined by the relationship of the DC command and the DC feedback signals, thereby changing the current supplied through terminals 126, 128 and coil 112 of servo valve 110. This causes a change in the position of plunger 114, thereby varying the output pressure $P_{OUT}$. This change in output pressure is sensed by capacitive pressure sensor 25', which supplies signals to circuit 120 over lines 116 and 118. The changing pressure sensed by capacitor pressure sensor 25' causes circuit 220 to change the feedback current $I \propto P$ supplied to feedback resistor 144. This in turn changes the DC feedback signal voltage supplied to the inverting of error amplifier 148. This process continues until the DC feedback signal becomes equal to the DC command signal at the new balance point. The output of amplifier 148 then remains constant until another change in current $I_t$ occurs.

The output pressure point may be used for adjusting some element in a process, such as a pneumatic valve or other pneumatically controlled element.

The pressure in line 115 acts as an input to a gaseous fluid amplifier 21' which corresponds to the amplifier 21 in the previous forms of the invention. As schematically shown in FIG. 6, the fluid amplifier includes the movable wall-valve arrangement as shown in FIGS. 2 through 4. To use the fluid amplifier arrangement of FIGS. 2-4, conduit 115 is connected to chamber 35 through passageway 34 shown in FIGS. 1 and 2, and passageway 32 is blocked off so that the pressure in conduit 115 from valve 110 would be pressure in chamber 35.

As shown in FIG. 6, a mounting 30' supports an upright column or block 31' which has a chamber 35' defined therein. A passageway 34' opens to the chamber 35' and is also connected to the conduit 115. A flexible diaphragm or movable wall or element 36' shown in dotted lines in FIG. 6 is held in place with a housing 37'. The wall 36' is connected to a mechanical link such as a dowel indicated at 41' that is slidably mounted relative to the block 37' and is attached in a suitable manner at its opposite end from the wall 36' to a shaft portion of a valve element shown in dotted lines as a valve spool 42' in FIG. 6. The valve spool 42' is mounted in a valve spool housing 43'. The valve spool 42' is spring loaded with a spring 47'. The spring load on valve spool 42' can be adjusted in exactly the same manner as spool 42 shown in the previous forms of the invention. The valve spool is constructed to operate in the same way. Pressure supplies can be connected to the valve spool housing 43', and the position of the valve spool 42' determines the amount of fluid discharging to the vent shown, or provided to an output conduit 23' that corresponds to the conduit 23 in the previous form of the invention. The position of the valve spool 42' is thus dependent upon the position of the movable wall or element 36', which is a function of the pressure in conduit 115.

The apparatus as shown in FIG. 6, includes a valve, with a magnetic field responsive actuated control element in place of the flapper valve assembly and thus can easily be adapted for use with the fluid amplifier illustrated in FIGS. 2 through 4. The spring balanced valve spool 41, coupled to the movable wall or element 36' responds quickly to changes in pressure in conduit 115.

A further modified preferred embodiment of the present device, utilizing the circuit shown in FIG. 6 is illustrated in FIG. 7. In this device, a magnetic actuator utilizes a magnetic force generated by a coil corresponding to the coil 112 in FIG. 6. The actuator or movable member is used to directly actuate the valve spool 42', and the need for a movable wall or diaphragm is obviated. The force balanced valve spool 42' moves very smoothly, with low external force requirements. The spring balancing, or biasing of the spool fulfills the need for a low force requirement actuator quite well.

Referring specifically to FIG. 7, the valve body 43' is illustrated, and includes pressure supply input labeled $P_S$, and the output pressure conduit 23' which leads to the capacitive pressure sensor 25' and also provides the output control pressure to various control devices. The valve spool 42' is shown in dotted lines, and it is spring balanced with the spring 47' also as shown in this particular form of the invention.

The terminals 128 and 126 of the circuit of FIG. 6 are connected to a coil 129 which acts on a fixed magnetic actuator member illustrated schematically at 131. The actuator 131 provides a permanent magnetic field and also provides magnetic forces resulting from current in the coil 129. The actuator 131 is coupled magnetically to an outwardly extending actuator portion 133 of the valve spool 42'. This results in an action on the actuator portion 133 and spool 42' similar to the action of a permanent magnet motor to control movement of valve spool 42'. The magnetic actuator 131 takes the place of the dowel or link 41' in the form of the invention of FIG. 6. The actuator 131 can be mounted in suitable supports relative to the coil 129, and the valve spool 42' will move as a function of the magnetic flux developed by the coil 129 from the current through terminals 126 and 128.

Thus, in a reference position, the spring 47' will be set to provide for the balance of the valve spool 42' as in the previous forms of the invention. Changes in the current at terminals 126 and 128 will cause a change in the magnetic force from actuator 131 and this will cause the spool 42' to shift. The spring 47' then can be selected in rate to correlate to the forces being generated by the coil 129.

The same movements of valve spool 41' would occur as previously described. The valve spool would be shifted as a function of the input current to the circuit of FIG. 6. The resulting pressure at conduit 23' is used for operating control elements and also is sensed at the capacitive pressure sensor 25' shown in FIG. 6 for providing a feedback signal. In many instances the FIG. 7 device is preferred because its direct action permits the elimination of the movable wall portion of the system shown in FIG. 6.

Precise control and adequate outputs are provided with the device of the various embodiments shown herein.

What is claimed is:

1. A current to pressure converter apparatus including:

means providing an input electrical signal;

circuit means responsive to said input electrical signal to provide an output electrical signal;

a mounting block;

piezoelectric flapper means responsive to said output electrical signal including a flexture element having one end mounted on said block and having one free end, the amount of flexture of the free end being a function of the output electrical signal;

a housing mounted on said block having a movable wall defining a chamber;

a source of controlled fluid under pressure connected to said chamber;

a nozzle leading from said chamber, said free end being adjacent said nozzle to control discharge of fluid through the nozzle and control pressure in the chamber, and thereby control position of the movable wall as a function of the flexture of the flexture element;

fluid amplifier means mounted on said block adjacent said housing and having an outlet and including a valve spool movable to position to adjust the fluid pressure at the outlet of the fluid amplifier means;

bias means to urge the valve spool in a first direction;

means to mechanically couple the movable wall directly to said valve spool so movement of the movable wall in a second direction under changes in pressure causes the valve spool to move against the bias means thus controlling the position of the valve spool as a function of the amount of flexture of the flexture element and therefore of the output electrical signal; and pressure feedback means connected directly to sense the fluid pressure at the output to provide an electrical feedback signal to said circuit means which is a function of the fluid pressure at the outlet to achieve a balance in the circuit means upon changes in the input signal.

2. The apparatus of claim 1 wherein the bias means comprises a spring acting on said valve spool, and means to adjust the force exerted on said valve spool at a reference position by the bias means.

3. The apparatus of claim 1 wherein said chamber further includes:

a peripheral wall and said movable wall comprises a diaphragm member having its periphery attached to said peripheral wall.

4. The apparatus of claim 3 wherein said means to mechanically couple the movable wall to said valve element comprises:

a link connected to said wall at one end thereof and directly to said valve element at an opposite end thereof.

5. The apparatus of claim 3 wherein said means to mechanically couple comprises:

a lever pivotally mounted relative to said movable wall and said spool, one end of said lever being mechanically coupled to said spool and a second end of said lever being coupled to said movable wall.

6. The apparatus of claim 1 wherein said means forming a chamber comprises:

a bellows, said movable wall forming one end of said bellows.

* * * * *